INVENTOR.
Ralph S. Zebarth
BY
ATTORNEY.

Jan. 24, 1961   R. S. ZEBARTH   2,968,831
REVOLVING DRUM TYPE POULTRY PLUCKING MACHINE
Filed Sept. 6, 1955   2 Sheets-Sheet 2
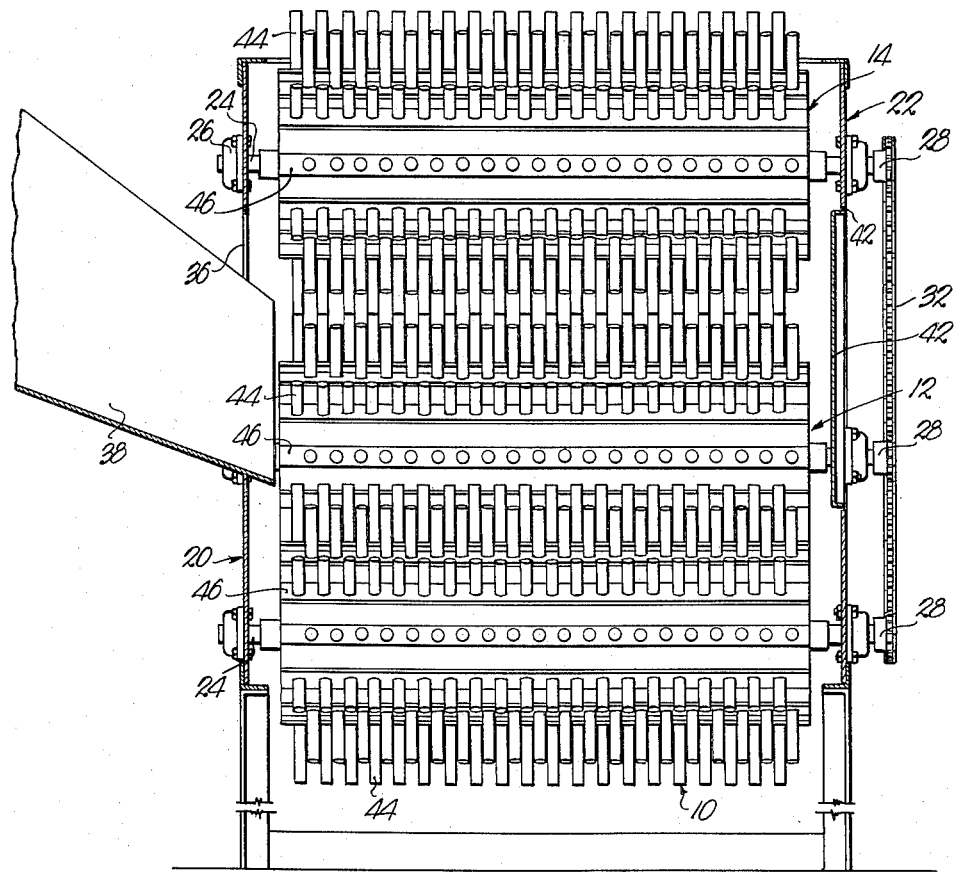
Fig. 2.
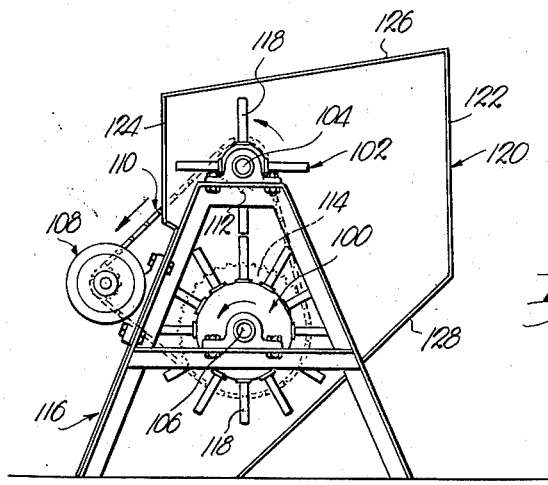
Fig. 3.
INVENTOR.
Ralph S. Zebarth
BY
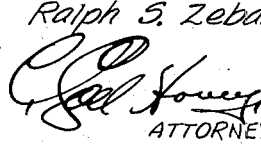
ATTORNEY.

United States Patent Office 2,968,831
Patented Jan. 24, 1961

2,968,831
REVOLVING DRUM TYPE POULTRY PLUCKING MACHINE

Ralph S. Zebarth, Hickman Mills, Mo., assignor, by mesne assignments, to Gordon Johnson Company, Kansas City, Mo., a corporation of Missouri Filed Sept. 6, 1955, Ser. No. 532,478

4 Claims. (Cl. 17—11.1)

This invention relates to equipment for automatically removing feathers from poultry and has for its primary object the provision of a machine operable on the novel principle of tumbling the birds continuously until the feathers are completely removed therefrom, all without restraining the movement of the birds in any manner whatsoever.

It is the most important object of the present invention to provide a feather picking machine employing picking drums which, of themselves, may be quite conventional in character but arranged in a special manner to avoid the necessity of shackling the birds to a conveyor as has heretofore been the practice, or otherwise restraining or holding the birds during the feather-picking operation.

Another important object of the instant invention is to provide a machine for plucking the feathers from poultry which contemplates the utilization of fingered picking drums arranged for continuous rotation in a manner to project the birds from drum to drum so that the same are tumbled, rolled and otherwise tossed and thrown about in a disorderly and irregular manner to the end that all parts of the bird are ultimately contacted by the picking fingers and therefore, all of the feathers removed therefrom in a relatively short period of time.

In the drawings:

Fig. 2 is a cross-sectional view taken on line II—II of Fig. 1; and

Fig. 3 is an end elevational view on a reduced scale illustrating a modified form of the instant invention.

Figure 1:
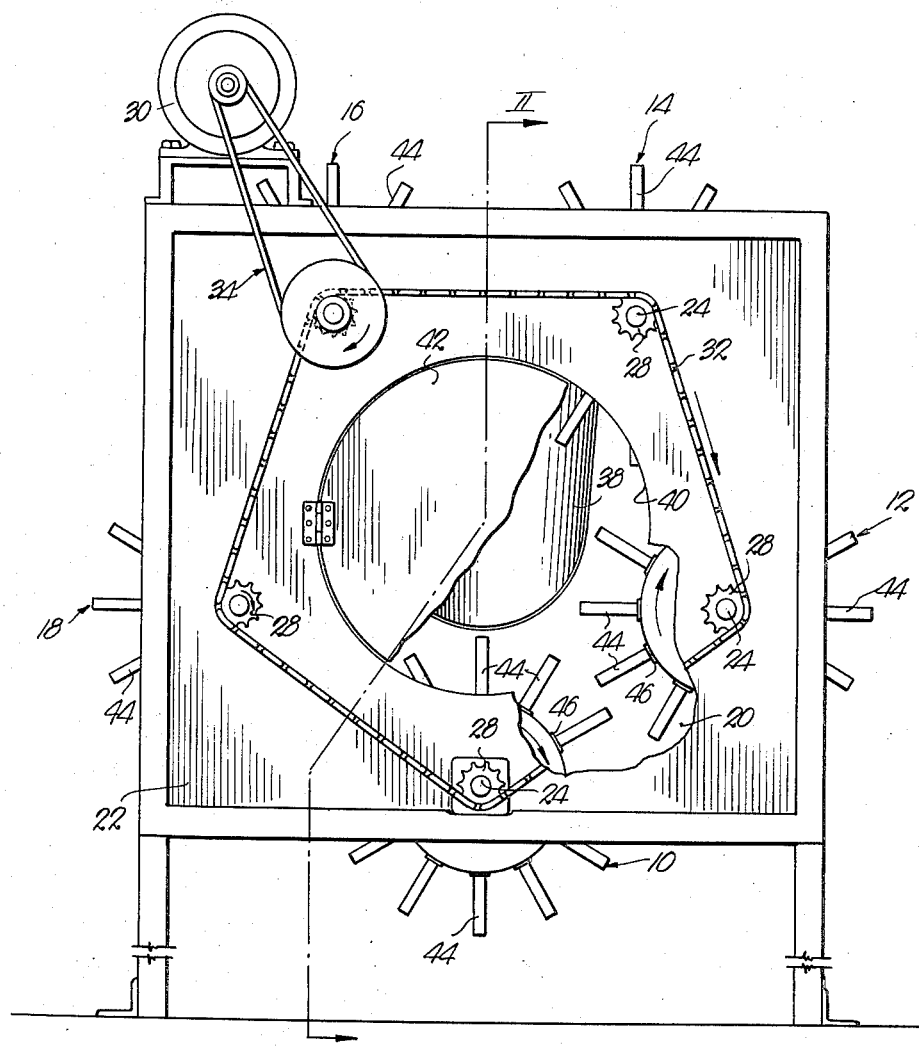
Figure 1 is an end elevational view of a revolving drum-type poultry plucking machine made pursuant to one form of my present invention, parts being broken away to reveal details of construction.

In the tumbler-type of poultry plucking machine shown by Figs. 1 and 2 of the drawings, there is provided a plurality of identical picking drums broadly designated by the numerals 10, 12, 14, 16 and 18 arranged in a circular row concentric to the longitudinal axis of the machine, i.e. the horizontal axis of the machine extending between end supports 20 and 22.

Horizontal axles 24 for the five drums chosen for illustration, are rotatably carried in suitable bearings 26 mounted on the end walls 20 and 22 and each shaft or axle 24 is provided with a sprocket wheel 28 at one end thereof. The sprocket wheels 28 are preferably of identical diameters and, therefore, when the same are driven by an electric motor or other power means 30, through a continuous chain 32 trained about the sprockets 28, the picking drums will all rotate continuously in the same direction and at the same speed. Belt and pulley means 34 operably interconnect the motor 30 and one of the shafts 24.

The wall 20 is provided with an inlet 36 into which extends a conveyor chute 38 and the wall 22 has an outlet opening 40 normally closed by a door 42.

While the picking drums may be of any suitable conventional character, the form thereof chosen for illustration of the principles of the instant invention is particularly adaptable to produce desirable results and, to this end, each of the said drums includes a plurality of elongated, radial, outwardly-extending fingers 44 preferably made from resilient, yet relatively stiff material such as heavy rubber. And, to the end that the fingers 44 will more effectively wipe the birds clean of even the minutest, hard-to-remove pin feathers, it is to be preferred that the fingers 44 be exteriorly roughened at least at their outermost terminal ends.

The fingers 44 of each of the drums are desirably arranged in longitudinal rows parallel with the horizontal axes of rotation of the drums, and to this end, the tubular fingers 44 are secured at their innermost ends directly to longitudinal bars 46 spaced equally about, and concentric to, the corresponding axles 24.

The manner of attachment of the fingers 44 to the bars 46 and the way in which the bars 46 are held in place for rotation with the axles 24, forms no part of the instant invention and, therefore, need not be outlined. It is important to note however, that the drums are disposed in relatively close juxtaposition to the end that, when the same rotate, as for example in the direction shown by the arrows in Fig. 1, the outermost ends of the fingers 44 are relatively close together. When the poultry is subjected to the action of the fingers 44 therefore, there will be no tendency for such birds to escape from the machine between adjacent drums.

Instead, when the poultry is fed into the machine at the longitudinal axis thereof via chute 38, it will immediately be tumbled about therewithin by the constantly rotating drums 10, 12, 14, 16 and 18 in an irregular pattern and within but a short period of time all parts of the bird will be contacted and all of the feathers thereof removed.

In actual practice it has been found that the fingers 44 not only contact and wipe against the feathers to gently pull the same from the birds, but fingers 44 operate to project the birds from drum to drum. While essentially the movement of the birds is radial in all directions, the poultry also has a tendency to move from end to end of the drum. The birds are not only continuously projected into space and against opposed drums, but are rotated and tumbled in a manner to obviate any tendency for particular areas to be subjected to the fingers 44 more often than other parts of the bird. In furtherance of the desirability of assuring complete subjection of the entire bird to the action of the fingers 44, it is to be preferred that the fingers 44 of each row be offset relative to the row next adjacent thereto, as is seen in Fig. 2 of the drawings.

While means might easily be provided for assuring movement of the birds from the support 20 to the support 22, during the cycle of operation, such additional features forms no part of the instant invention and has not been illustrated. It is contemplated that the birds may well be removed manually by opening of the door 42 after a predetermined period of time.

In Fig. 3 of the drawings, there is illustrated a simplified form of the invention embodying the same principles as above set forth, which modification can, in some instances, be advantageous. It contemplates the provision of a pair of picking drums 100 and 102 which may likewise be identical in nature to the drums 10, 12, 14, 16 and 18 except only as noted, the drum 100 is considerably greater in diameter than the drum 102. Notable also, is the fact that the horizontal axle 104 for the drum 102, is disposed in a higher plane than the axle 106 for rotatably supporting the drum 100, it being understood that the axles 104 and 106 are in parallelism.

Power means in the nature of an electric motor 108 is illustrated as the means for rotating the drums 100 and 102 through a continuous chain 110. In this embodiment, sprocket wheel 112 on drum 102 is smaller than the sprocket wheel 114 on drum 100 to the end that the latter rotates somewhat slower than the drum 102. Here again, the drums 100 and 102 are carried by spaced-apart end supports, one of which is seen in Fig. 3 and designated by the numeral 116. Still further, it is to be noted that the drums 100 and 102 are disposed so that during rotation, the picking fingers 118 thereof are in close juxtaposition at the outermost terminal ends thereof.

The drums 100 and 102 may be considered analogous to the drums 10 and 12 for example, and it is seen in Figs. 1 and 2 that the drums 14, 16 and 18, disposed outwardly and upwardly from the drums 10 and 12, act as means for confining the poultry within predetermined limits as the same are projected upwardly and outwardly by the drums 10 and 12.

In the embodiment of Fig. 3 on the other hand, such means of confinement takes the form of a shield broadly designated by the numeral 120 and having a pair of side walls 122 and 124, a top wall 126 and a bottom wall 128 inclined downwardly and inwardly from the lowermost end of the wall 122 to a point beneath the lowermost drum 100.

While the shield 120 may be provided with end walls as in the form of the invention shown by Figs. 1 and 2, the same is shown open at both ends to the end that the birds may be thrown thereinto at one end of the machine and removed from the opposite end thereof. The birds landing upon the inclined bottom wall 128, immediately slide into the drum 100, and by virtue of the fact that the same rotates anti-clockwise viewing Fig. 3, the birds are projected upwardly toward the walls 120 and 126, as well as into the path of travel of the fingers 118 of the faster rotating drum 102.

Inasmuch as the action of the drum 102 upon the birds takes place while the latter are suspended in the air, it is desirable that the drum 102 rotate at a relatively high rate so that the fingers 118 thereof will strike the birds as often as possible prior to gravitation thereof back to the drum 100 or the bottom 128. Manifestly, the walls 126 and 128 are disposed sufficiently close to the peripheries of drums 102 and 100 respectively, to obviate any tendency of the birds to escape from the machine during the feather picking operation.

Having thus described the invention what is claimed as new and desired to be secured by Letters Patent is:

1. In a poultry plucking machine of the tumbler type, a number of elongated drums, each provided with a horizontal axis and a plurality of radial, feather plucking fingers, said axes being arranged in a circular pattern whereby to present a space completely surrounded by the drums for receiving poultry to be defeathered; and means mounting said drums for rotation about said axes whereby poultry freely disposed in said space is continuously projected from drum to drum and subjected to the action of the fingers of all the drums, the free ends of the fingers of each drum being closely adjacent the free ends of the fingers of adjacent drums and there being provided means for rotating the drums in the same direction whereby to prevent passage of poultry between the drums from said space.

2. In a poultry plucking machine of the tumbler type, a number of elongated drums, each provided with a shaft having a horizontal axis and a plurality of radial, feather plucking fingers, said shafts being arranged in a circular pattern whereby to present a space completely surrounded by the drums for receiving poultry to be defeathered; and means at the ends of said drums supporting the shafts for rotation of the drums about said axes whereby poultry freely disposed in said space is continuously projected from drum to drum and subjected to the action of the fingers of all the drums, said space spanning the distance between said shaft-supporting means, the free ends of the fingers of each drum being closely adjacent the free ends of the fingers of adjacent drums and there being provided means for rotating the drums in the same direction whereby to prevent passage of poultry between the drums from said space.

3. The invention of claim 2, said shaft-supporting means including a pair of vertical walls, one of which has an access opening provided with a door.

4. The invention of claim 3, the other wall being provided with an opening having a poultry conveyor chute extending thereinto.

References Cited in the file of this patent

UNITED STATES PATENTS

| | | |
|---|---|---|
| 1,885,161 | Wernberg | Nov. 1, 1932 |
| 2,012,655 | Bowman | Aug. 27, 1935 |
| 2,084,856 | McKee et al. | June 22, 1937 |
| 2,472,468 | Digby | June 7, 1949 |
| 2,641,796 | Johnson | June 16, 1953 |
| 2,830,315 | Toti | Apr. 15, 1958 |